(12) United States Patent
Song et al.

(10) Patent No.: US 10,312,479 B2
(45) Date of Patent: Jun. 4, 2019

(54) FLEXIBLE RECHARGEABLE BATTERY

(71) Applicant: Samsung SDI Co., Ltd., Yongin-si, Gyeonggi-do (KR)

(72) Inventors: Hyun-Hwa Song, Yongin-si (KR); Jun-Won Suh, Yongin-si (KR); Jan-Dee Kim, Yongin-si (KR); Jeong-Doo Yi, Yongin-si (KR); Jung-Gyu Nam, Yongin-si (KR); Bong-Kyoung Park, Yongin-si (KR); Jung-Yup Yang, Yongin-si (KR); Ju-Hyeong Han, Yongin-si (KR); Ju-Hee Sohn, Yongin-si (KR); Hye-Ri Eom, Yongin-si (KR); Da-Woon Han, Yongin-si (KR); Sol Choi, Yongin-si (KR); Seok-Hun Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 149 days.

(21) Appl. No.: 15/345,339

(22) Filed: Nov. 7, 2016

(65) Prior Publication Data

US 2017/0155099 A1    Jun. 1, 2017

(30) Foreign Application Priority Data

Nov. 30, 2015  (KR) .................. 10-2015-0169380

(51) Int. Cl.
*H01M 2/02*  (2006.01)
*H01M 2/08*  (2006.01)
(Continued)

(52) U.S. Cl.
CPC ....... *H01M 2/0275* (2013.01); *H01M 2/0287* (2013.01); *H01M 2/08* (2013.01);
(Continued)

(58) Field of Classification Search
CPC ............................ H01M 4/668; H01M 2/0275
See application file for complete search history.

(56) References Cited

U.S. PATENT DOCUMENTS 5,989,751 A    11/1999  Cotte et al.
8,974,945 B2   3/2015   Yang
(Continued)

FOREIGN PATENT DOCUMENTS

KR  10-2003-0033214 A   5/2003
KR  10-2008-0056644 A   6/2008
(Continued)

OTHER PUBLICATIONS

Extended European Search Report dated Feb. 3, 2017 of the corresponding European Patent Application No. 16200126.7, (7 pages).
(Continued)

*Primary Examiner* — Matthew J Merkling
(74) *Attorney, Agent, or Firm* — Lewis Roca Rothergerber Christie LLP

(57) ABSTRACT

A flexible rechargeable battery includes: a first conductive substrate; a second conductive substrate facing the first conductive substrate; and a sealant at edges of the first conductive substrate and the second conductive substrate. The first conductive substrate includes a first resin layer, a first barrier layer, a second resin layer, a first electrode current collector layer, and a first electrode coating layer that are sequentially stacked inward from a first side of the flexible rechargeable battery. The second conductive substrate includes a third resin layer, a second barrier layer, a fourth resin layer, a second electrode current collector layer, and a second electrode coating layer that are sequentially stacked inward from a second side of the flexible rechargeable battery.

15 Claims, 8 Drawing Sheets

(51) Int. Cl.
  *H01M 4/36* (2006.01)
  *H01M 4/66* (2006.01)
  *H01M 10/02* (2006.01)
  *H01M 10/0585* (2010.01)

(52) U.S. Cl.
  CPC ........... *H01M 4/366* (2013.01); *H01M 4/667* (2013.01); *H01M 4/668* (2013.01); *H01M 10/02* (2013.01); *H01M 10/0585* (2013.01); *H01M 2220/30* (2013.01)

(56) References Cited

U.S. PATENT DOCUMENTS

| | | |
|---|---|---|
| 2008/0145750 A1 | 6/2008 | Yang |
| 2011/0133574 A1 | 6/2011 | Nitsche et al. |
| 2011/0217570 A1 | 9/2011 | Yang |
| 2013/0029205 A1 | 1/2013 | Adams et al. |
| 2013/0089774 A1 | 4/2013 | Chami |
| 2013/0130091 A1 | 5/2013 | Yang |
| 2013/0309547 A1 | 11/2013 | Bazzarella et al. |
| 2014/0147731 A1 | 5/2014 | Anastas et al. |
| 2016/0293905 A1* | 10/2016 | Bedjaoui ............ H01M 2/0275 |
| 2018/0026236 A1* | 1/2018 | Lee ..................... H01M 2/0212 429/127 |

FOREIGN PATENT DOCUMENTS

| | | | |
|---|---|---|---|
| KR | 10-2014-0123393 A | 10/2014 | |
| KR | 10-2015-0058957 A | 5/2015 | |

OTHER PUBLICATIONS

EPO Office Action dated Feb. 7, 2018, for corresponding European Patent Application No. 16200126.7 (6 pages).

* cited by examiner

FLEXIBLE RECHARGEABLE BATTERY

RELATED APPLICATION

This application claims priority to and the benefit of Korean Patent Application No. 10-2015-0169380, filed in the Korean Intellectual Property Office on Nov. 30, 2015, the entire content of which is incorporated herein by reference.

BACKGROUND

1. Field

The described technology relates generally to a flexible rechargeable battery.

2. Description of the Related Art

Recently, as technologies for flexible display devices are developed, demand for flexible rechargeable batteries as an energy source has increased.

Generally, a stacked-type battery is manufactured by inserting an electrode assembly, which is formed by alternately stacking a positive electrode and a negative electrode with a separator interposed therebetween, into a pouch, and then sealing the pouch.

However, when a conventional pouch-type battery is repeatedly bent (e.g., is repeatedly bent to have a constant curvature radius), it may be subjected to compressive stress and tensile stress and, because it is not flexible, may be damaged.

The above information disclosed in this Background section is provided to enhance the understanding of the background of the disclosure, and therefore, it may contain information that does not form prior art.

SUMMARY

Embodiments of the present disclosure provide a rechargeable battery having excellent bending and folding characteristics.

An embodiment of the present disclosure provides a flexible rechargeable battery including: a first conductive substrate; a second conductive substrate facing the first conductive substrate; and a sealant at edges of the first conductive substrate and the second conductive substrate. The first conductive substrate includes a first resin layer, a first barrier layer, a second resin layer, a first electrode current collector layer, and a first electrode coating layer that are sequentially stacked inward from a first side of the rechargeable battery, and the second conductive substrate includes a third resin layer, a second barrier layer, a fourth resin layer, a second electrode current collector layer, and a second electrode coating layer sequentially stacked inward from a second side of the rechargeable battery.

The flexible rechargeable battery may further include an electrode assembly between the first conductive substrate and the second conductive substrate, and the electrode assembly may include a first inner electrode, a second inner electrode, and a separator between the first inner electrode and the second inner electrode.

At least one of the second resin layer and the fourth resin layer may include a plurality of opening therethrough.

The sealant may be at edges of the first electrode current collector layer and at edges of at least one of the second electrode current collector layer, the fourth resin layer, the second barrier layer, and the third resin layer.

The sealant may be at edges of the second resin layer and at edges of at least one of the second electrode current collector layer, the fourth resin layer, the second barrier layer, and the third resin layer.

The sealant may be at edges of the first barrier layer and at edges of at least one of the second electrode current collector layer, the fourth resin layer, the second barrier layer, and the third resin layer.

The sealant may be at edges of the first resin layer and at edges of at least one of the second electrode current collector layer, the fourth resin layer, the second barrier layer, and the third resin layer.

At least one of the first resin layer, the second resin layer, the third resin layer, and the fourth resin layer may include polyimide (PI), polyether ether ketone (PEEK), polyethersulfone (PES), polyetherimide (PEI), polycarbonate (PC), and/or polyethylene terephthalate (PET).

The first resin layer and the second resin layer may include the same material.

The third resin layer and the fourth resin layer may include the same material.

At least one of the first barrier layer and the second barrier layer may include a conductive metal.

The sealant may include a material having the same thermal expansion rate as at least one of the first resin layer, the second resin layer, the third resin layer, and the fourth resin layer.

The flexible rechargeable battery according to one or more embodiments of the present disclosure may further include a circuit film on an outer surface of at least one of the first conductive substrate and the second conductive substrate.

Embodiments of the present disclosure provide a battery pack including the flexible rechargeable battery as a unit battery.

Embodiments of the present disclosure also provide a device including the battery pack as a power source.

The flexible rechargeable battery according to embodiments of the present disclosure may remain stable even when repeatedly bent or folded.

BRIEF DESCRIPTION OF THE DRAWINGS

Additional aspects and features of the present disclosure may be derived from the content described below with reference to the drawings, in addition to the aforementioned description.

DETAILED DESCRIPTION

Figure 1:
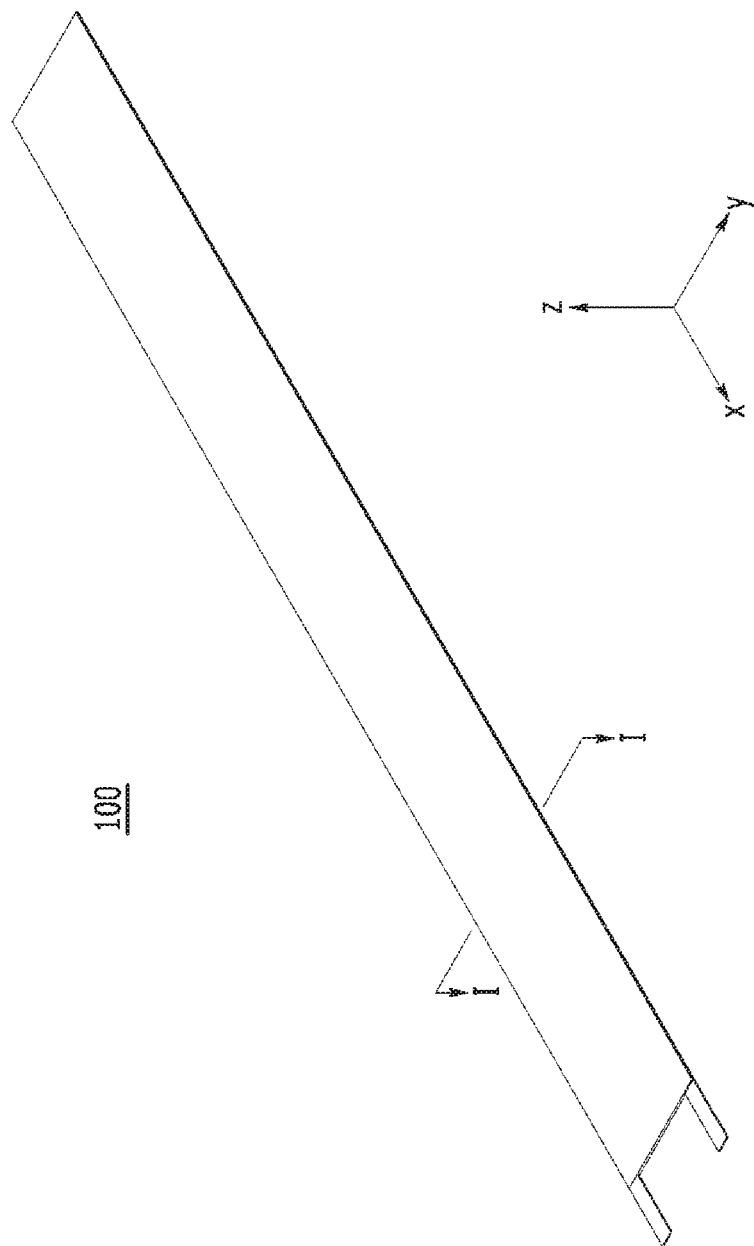
FIG. 1 is a perspective view of a flexible rechargeable battery according to an exemplary embodiment.

Aspects of the present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

The drawings and description are to be regarded as illustrative in nature and not restrictive. For example, in the drawings, a size and/or thickness of illustrated elements may be arbitrarily represented for better understanding and ease of description, and as such, the present disclosure is not limited thereto. Like reference numerals designate like elements throughout the specification.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. In addition, unless explicitly described to the contrary, the words "include" and "comprise" and variations thereof, such as "includes," "including," "comprises," and "comprising," will be understood to imply the inclusion of the stated elements but not the exclusion of any other elements.

It will be understood that when an element or layer is referred to as being "on," "connected to," or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

Figure 2:
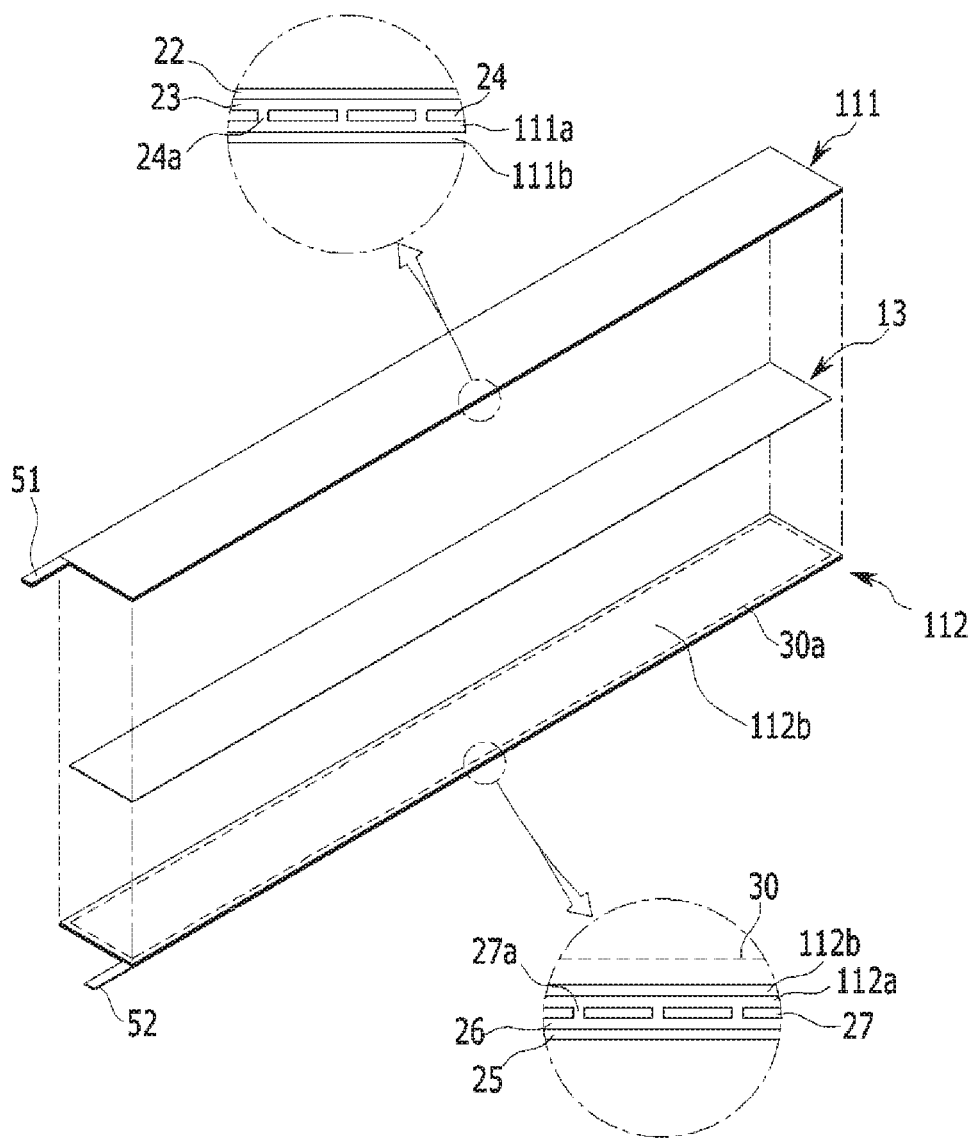
FIG. 2 is an exploded perspective view of the rechargeable battery shown in FIG. 1.
Figure 3:
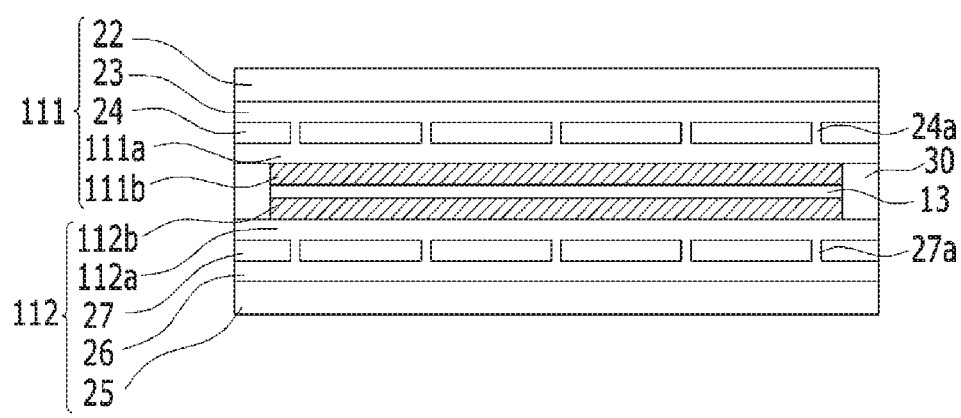
FIG. 3 is a cross-sectional view taken along the line I-I of FIG. 1.

FIG. 1 is a perspective view of a flexible rechargeable battery according to an exemplary embodiment, FIG. 2 is an exploded perspective view of the rechargeable battery shown in FIG. 1, and FIG. 3 is a cross-sectional view taken along the line I-I of FIG. 1.

Referring to FIGS. 1-3, a flexible rechargeable battery 100 according to an exemplary embodiment includes a first conductive substrate 111 and a second conductive substrate 112 disposed to face each other. The first and second conductive substrates 111 and 112 are adhered and sealed to each other via a sealing part 30 (e.g., a sealant) positioned on edges of the first conductive substrate 111 and the second conductive substrate 112.

In embodiments of the present disclosure, the first conductive substrate 111 and the second conductive substrate 112 may function as different electrodes from each other. For example, when the first conductive substrate 111 functions as a positive electrode, the second conductive substrate 112 may function as a negative electrode. When the first conductive substrate 111 functions as the negative electrode, the second conductive substrate 112 may function as the positive electrode.

The first conductive substrate 111 may include a first resin layer 22, a first barrier layer 23, a second resin layer 24, a first electrode current collector layer 111a, and a first electrode coating layer 111b that are sequentially deposited (e.g., sequentially stacked) from an outer surface of the rechargeable battery 100.

In one or more embodiments, the first resin layer 22 and the second resin layer 24 may include (or may be made of) polyimide (PI), polyether ether ketone (PEEK), polyethersulfone (PES), polyetherimide (PEI), polycarbonate (PC), and/or polyethylene terephthalate (PET); however, the present disclosure is not specifically limited thereto.

In embodiments of the present disclosure, the first resin layer 22 and the second resin layer 24 may include (or may be made of) different materials; however, when the first resin layer 22 and the second resin layer 24 include (or are made of) the same material, deposition thereof is easier and there is a process merit in that a condition (or specially changed) may not be changed during manufacturing.

The first barrier layer 23 may be formed between the first resin layer 22 and the second resin layer 24. The first barrier layer 23 may include (or may be made of) a conductive metal. The first barrier layer 23 may prevent external moisture from penetrating into the rechargeable battery 100.

In one or more embodiments, the conductive metal may be copper, aluminum, nickel, and/or stainless steel, but the conductive metal is not limited thereto. The material of the first barrier layer 23 may be the same as or different from that of the first electrode current collector layer 111a; however, the material of the first barrier layer 23 is not limited thereto.

In one or more embodiments of the present disclosure, the first barrier layer 23 may be made of nickel or stainless steel.

Also, the first barrier layer 23 may be formed as a metal coating layer that is formed on or as a metal foil that is adhered to one surface of the first resin layer 22, but the first barrier layer 23 is not limited thereto.

In one embodiment, the second resin layer 24 may have a porous structure including a plurality of pores (e.g., the second resin layer 24 may have a plurality of openings therethrough). The porous structure forms a first conducting part 24a (e.g., a first conducting opening or openings) allowing conduction (e.g., electrical conduction) between the first barrier layer 23 and the first electrode current collector layer 111*a* (e.g., allowing electrical communication between the first barrier layer 23 and the first electrode current collector layer 111*a*) that will be further described later. When the first conducting part 24*a* is included in the second resin layer 24, a first electrode tab 51 may be adhered to the first electrode current collector layer 111*a* and/or the first barrier layer 23.

The first electrode current collector layer 111*a* is formed on the second resin layer 24.

The first electrode current collector layer 111*a* may include (or may be formed of), for example, aluminum, copper, nickel aluminum, stainless steel, titanium, and/or alloys thereof. A surface treatment of carbon, nickel, and/or titanium may be applied on at least one surface of the first electrode current collector layer 111*a* when it includes aluminum, copper, or stainless steel; however, the first electrode current collector layer 111*a* is not limited thereto. In one embodiment, when the first conductive substrate 111 functions as the negative electrode, the first electrode current collector layer 111*a* may be made of the copper material.

The first electrode current collector layer 111*a* may have a mesh structure or may be a metal foil.

The first electrode coating layer 111*b* may be formed on the first electrode current collector layer 111*a*.

The first electrode coating layer 111*b* may include (may be formed of) a carbon material, such as a crystalline carbon, an amorphous carbon, a carbon composite, a carbon fiber, etc., a lithium metal, a metal oxide, and/or lithium alloys, but the first electrode coating layer 111*b* is not limited thereto.

The second conductive substrate 112 may include a third resin layer 25, a second barrier layer 26, a fourth resin layer 27, a second electrode current collector layer 112*a*, and a second electrode coating layer 112*b* that are sequentially stacked inward from an outermost side of the rechargeable battery 100.

In one or more embodiments, the third resin layer 25 and/or the fourth resin layer 27 may include (or may be made of) polyimide (PI), polyether ether ketone (PEEK), polyethersulfone (PES), polyetherimide (PEI) polycarbonate (PC), and/or polyethylene terephthalate (PET); however, the third resin layer 25 and the fourth resin layer 27 are not limited thereto.

In embodiments of the present disclosure, the third resin layer 25 and the fourth resin layer 27 may include (or may be made of) different materials; however, when the third resin layer 25 and the fourth resin layer 27 are made of the same material, the deposition is easier and there is a process merit in that a condition during manufacture may not be changed.

The second barrier layer 26 may be formed between the third resin layer 25 and the fourth resin layer 27. The second barrier layer 26 may include (or may be made of) the conductive metal. The second barrier layer 26 may prevent or substantially prevent external moisture from penetrating into the rechargeable battery 100.

The conductive metal may include (or may be made of) copper, aluminum, nickel, and/or stainless steel, but the conductive metal is not limited thereto. The material of the second barrier layer 26 may be the same as or different from that of the second electrode current collector layer 112*a*, but the present disclosure is not limited thereto.

In one embodiment of the present disclosure, the second barrier layer 26 may be made of nickel or stainless steel.

The second barrier layer 26 may be formed as a metal coating layer that is formed on or a metal foil that is adhered to one surface of the third resin layer 25, but the second barrier layer 26 is not limited thereto.

The fourth resin layer 27 may have a porous structure including a plurality of pores (e.g., the fourth resin layer 27 may have a plurality of openings therethrough). The porous structure forms a second conducting part 27*a* (e.g., a second conducting opening or openings) allowing conduction (e.g., electrical conduction) between the second barrier layer 26 and the second electrode current collector layer 112*a* (e.g., allowing electrical communication between the second barrier layer 26 and the second electrode current collector layer 112*a*) that will be further described later. When the second conducting part 27*a* is included in the fourth resin layer 27, a second electrode tab 52 may be adhered to the second electrode current collector layer 112*a* and/or the second barrier layer 26.

The second electrode current collector layer 112*a* is formed on the fourth resin layer 27.

The second electrode current collector layer 112*a* may include (or may be formed of), for example, aluminum, copper, nickel, stainless steel, titanium, and/or alloys thereof, and a surface treatment of carbon, nickel, and/or titanium may be applied on at least one surface of the second electrode current collector layer 112*a* when it includes aluminum, copper, or stainless steel; however, the second electrode current collector layer 112*a* is not limited thereto. In one embodiment, when the second conductive substrate 112 functions as the positive electrode, the second electrode current collector layer 112*a* may be made of the aluminum material.

The second electrode current collector layer 112*a* may have a mesh structure or may be a metal foil.

A second electrode coating layer 112*b* may be formed on the second electrode current collector layer 112*a*.

The second electrode coating layer 112*b* may include (or may be formed of), for example, a metal, such as cobalt, manganese, and/or nickel, a lithium transition metal oxide, such as cobalt acid lithium, nickel acid lithium, nickel cobalt acid lithium, nickel cobalt aluminum acid lithium, nickel cobalt manganese acid lithium, manganese acid lithium, phosphate lithium, nickel sulfide, copper sulfide, sulfur, iron oxide, vanadium oxide, or combinations thereof, and/or composite oxides with lithium. However, the second electrode coating layer 112*b* is not limited thereto.

In one or more embodiments, a coating layer may be formed on a surface of the second electrode coating layer 112*b*, for example, on a surface of the metal and/or the composite oxide with lithium. In other embodiments, the metal and/or the composite oxide with lithium and the coating layer on the surface of the metal and/or the composite oxide with lithium may be mixed with each other. In this embodiment, the coating layer formed on the surface of the metal and/or the composite oxide with lithium may include a coating element compound, such as oxides of coating elements, hydroxides of coating elements, oxyhydroxides of coating elements, oxycarbonates of coating elements, and/or hydroxyl carbonates of coating elements. The coating element compound may be amorphous or crystalline.

As shown in FIG. 2, a separator 13 is positioned between the first conductive substrate 111 and the second conductive substrate 112.

The separator 13 separates the first conductive substrate 111 from the second conductive substrate 112 and provides a movement path for lithium ions. Any suitable separator used in a lithium battery may be used. For example, a separator having relatively low resistance and excellent humidification ability with respect to ion mobility of an electrolyte may be used. In one or more embodiments, the separator may include (or may be) glass fiber, polyester, polyethylene, polypropylene, polytetrafluoroethylene (PTFE), or a combination thereof and may be a non-woven fabric or a woven fabric. In a rechargeable battery (e.g., a lithium ion battery) according to embodiments of the present disclosure, a polyolefin-based polymer separator, such as polyethylene, polypropylene, and the like, a coated separator including a ceramic component or a polymer material included to provide heat resistance and increased mechanical strength, and/or a separator having a single-layer or multi-layer structure may be used.

As described above, because the first conductive substrate 111 and the second conductive substrate 112, which function as packaging materials of the rechargeable battery 100, include the first resin layer 22, the second resin layer 24, the third resin layer 25, and the fourth resin layer 27, each of which includes (or is made of) the polymer resin, the flexibility of the rechargeable battery according to embodiments of the present disclosure is excellent.

Figure 4:
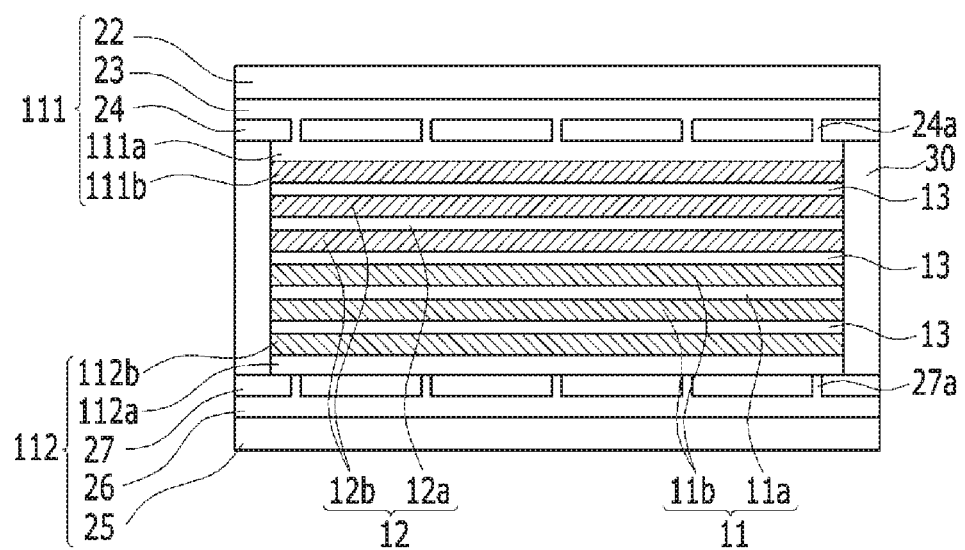
FIGS. 4-8 are cross-sectional views of flexible rechargeable batteries according to other exemplary embodiments, respectively.

FIG. 4 is a cross-sectional view of a flexible rechargeable battery according to another exemplary embodiment.

As shown in FIG. 4, an electrode assembly according to one or more embodiments includes a first inner electrode 11 and second inner electrode 12 that are alternately arranged (or deposited) about the separator 13 (e.g., are alternately deposited about a boundary of the separator 13) and are between the first conductive substrate 111 and the second conductive substrate 112. In other embodiments, the electrode assembly may include a plurality of the first inner electrodes 11 and a plurality of the second inner electrodes 12. In FIG. 4, for convenience of understanding, the electrode assembly including one first inner electrode 11 and one second inner electrode 12 is shown; however, a plurality of the first inner electrodes 11 and a plurality of the second inner electrodes 12 may be arranged about the separator 13.

In the illustrated embodiment, the first inner electrode 11 may be the negative electrode and may include a first inner electrode current collector layer 11a and a first inner electrode coating layer 11b formed on the first inner electrode current collector layer 11a.

The first inner electrode current collector layer 11a may include (or may be) a copper film, a nickel film, a stainless steel film, a titanium film, a nickel foam, a copper foam, a polymer substrate coated with the conductive metal, or combinations thereof, but the first inner electrode current collector layer 11a is not limited thereto.

The first inner electrode coating layer 11b may include (or may be formed by using) a composition including a negative active material on (e.g., coated on) one surface or both surfaces of the first inner electrode current collector layer 11a. As the negative active material, a material that can perform reversible intercalation and deintercalation of lithium ions, a lithium metal, an alloy of the lithium metal, a material doping or dedoping lithium, a transition metal oxide, or a combination thereof may be used. The first inner electrode coating layer 11b (e.g., a composition for forming the first inner electrode coating layer 11b) may further include a binder, a conductive material, and/or a thickener as well as the negative active material.

The second inner electrode 12 may be the positive electrode and includes a second inner electrode current collector layer 12a and a second inner electrode coating layer 12b formed on the second inner electrode current collector layer 12a.

In one or more embodiments, the second inner electrode current collector layer 12a may include (or may be) an aluminum film, the nickel film, the stainless steel film, the titanium film, the nickel foam, an aluminum foam, the polymer substrate coated with the conductive metal, or a combination thereof, but the second inner electrode current collector layer 12a is not limited thereto.

The second inner electrode coating layer 12b may include (or may be formed by using) a composition including a positive active material on one surface or both surfaces of the second inner electrode current collector layer 12a. The positive active material may include (or may be) a compound (e.g., a lithiated intercalation compound) capable of reversibly intercalating and deintercalating lithium ions, but the positive active material is not limited thereto. The second inner electrode coating layer 12b (e.g., a composition for forming the second inner electrode coating layer 12b) may further include a binder, a conductive material, and/or a thickener as well as the positive active material.

According to embodiments of the present disclosure, the first conductive substrate 111 and the second conductive substrate 112 function as the electrodes and as the packaging materials of the rechargeable battery 100 such that separate packaging materials may not be included. Accordingly, compared with a conventional rechargeable battery, a rechargeable battery according to embodiments of the present disclosure having the same area (e.g., the same surface area) and the same capacity (e.g., the same battery capacity) may be provided while a thickness of the rechargeable battery according to embodiments of the present disclosure may be remarkably or significantly reduced. Also, when bending or folding the rechargeable battery, the force applied to the rechargeable battery according to embodiments of the present disclosure may be remarkably or significantly reduced even when the compression stress and the tensile stress are repeatedly applied thereto such that stability of the rechargeable battery according to embodiments of the present disclosure may be easily maintained.

Next, the sealing part 30 will be further described. FIGS. 3 and 5-7 are cross-sectional views of flexible rechargeable batteries according to embodiments of the present disclosure having different sealing parts 30.

According to embodiments of the present disclosure, the sealing part 30 may be positioned on (e.g., along) edges of the first electrode current collector layer 111a of the first conductive substrate 111 and the second electrode current collector layer 112a of the second conductive substrate 112, the fourth resin layer 27, the second barrier layer 26, and/or the third resin layer 25. For example, the sealing part 30 may be positioned on the edges of the first electrode current collector layer 111a and the second electrode current collector layer 112a, the sealing part 30 may be positioned on the edges of the first electrode current collector layer 111a and the fourth resin layer 27, the sealing part 30 may be positioned on the edges of the first electrode current collector layer 111a and the second barrier layer 26, and/or the sealing part 30 may be positioned on the edges of the first electrode current collector layer 111a and the third resin layer 25, but the present disclosure is not limited thereto.

FIG. 3 shows an embodiment in which the sealing part 30 is positioned on the edges of the first electrode current collector layer 111a and the second electrode current collector layer 112a.

In this embodiment, a horizontal cross-sectional area (e.g., an area of an x-y plane, for example, directions perpendicular to the thickness direction of the flexible rechargeable battery) of the first electrode coating layer 111b is smaller than a horizontal cross-sectional area of the first electrode current collector layer 111a.

Also, a horizontal cross-sectional area (e.g., the area of the x-y plane, for example, the directions perpendicular to the thickness direction of the flexible rechargeable battery) of the second electrode coating layer 112b is smaller than a horizontal cross-sectional area of the second electrode current collector layer 112a.

Accordingly, an encapsulation region 30a (see FIG. 2) is present on (e.g., along) the edges of surfaces of the first electrode current collector layer 111a and the second electrode current collector layer 112a that face each other, and the sealing part 30 is formed thereon (e.g., the sealing part 30 is formed at the encapsulation region 30a), thereby encapsulating the first conductive substrate 111 and the second conductive substrate 112.

According to other embodiments of the present disclosure, the sealing part 30 may be positioned on the edges of the second resin layer 24 of the first conductive substrate 111 and the second electrode current collector layer 112a of the second conductive substrate 112, the fourth resin layer 27, the second barrier layer 26, and/or the third resin layer 25. For example, the sealing part 30 may be formed on the edges of the second resin layer 24 and the second electrode current collector layer 112a, the sealing part 30 may be formed on the second resin layer 24 and the fourth resin layer 27, the sealing part 30 may be formed on the second resin layer 24 and the second barrier layer 26, or the sealing part 30 may be formed on the second resin layer 24 and the third resin layer 25, but the present disclosure is not limited thereto.

Figure 5:
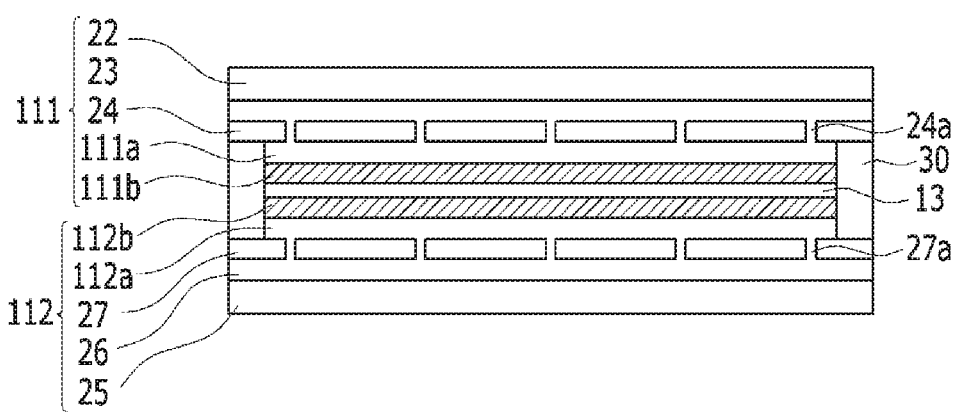

FIG. 5 shows one or more embodiments of the present disclosure in which the sealing part 30 is positioned on the edges of the second resin layer 24 and the fourth resin layer 27.

In this embodiment, the horizontal cross-sectional area (e.g., the area of the x-y plane, for example, the directions perpendicular to the thickness direction of the flexible rechargeable battery) of the first electrode current collector layer 111a and the first electrode coating layer 111b is smaller than the horizontal cross-sectional area of the second resin layer 24.

Also, the horizontal cross-sectional area (e.g., the area of the x-y plane, for example, the directions perpendicular to the thickness direction of the flexible rechargeable battery) of the second electrode current collector layer 112a and the second electrode coating layer 112b is smaller than the horizontal cross-sectional area of the fourth resin layer 27.

The encapsulation region 30a is present on the edges of surfaces of the second resin layer 24 and the fourth resin layer 27 that face each other, and the sealing part 30 is formed thereon (e.g., is formed at the encapsulation region 30a), thereby encapsulating the first conductive substrate 111 and the second conductive substrate 112.

According to other embodiments of the present disclosure, the sealing part 30 may be formed on the edges of the first barrier layer 23 of the first conductive substrate 111 and the second electrode current collector layer 112a of the second conductive substrate 112, the fourth resin layer 27, the second barrier layer 26, and/or the third resin layer 25. For example, the sealing part 30 may be formed on the edges of the first barrier layer 23 and the second electrode current collector layer 112a, the sealing part 30 may be formed on the edges of the first barrier layer 23 and the fourth resin layer 27, the sealing part 30 may be formed on the edges of the first barrier layer 23 and the second barrier layer 26, or the sealing part 30 may be formed on the edges of the first barrier layer 23 and the third resin layer 25, but the present disclosure is not limited thereto.

Figure 6:
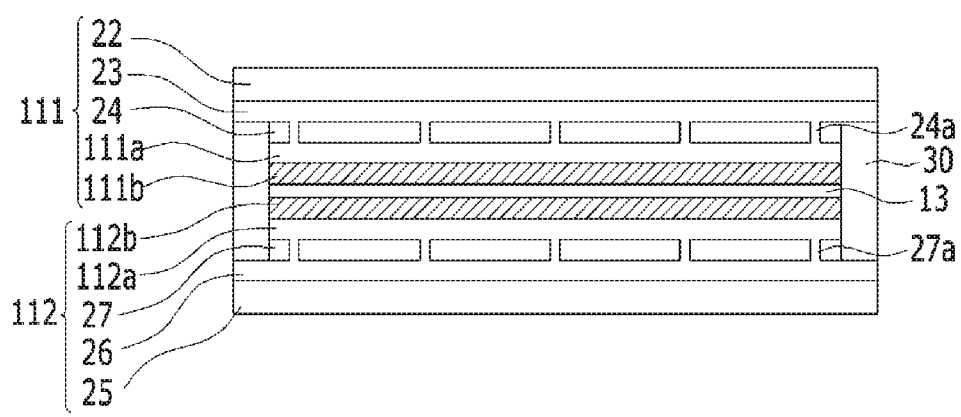

FIG. 6 shows one or more embodiments of the present disclosure in which the sealing part 30 is positioned on the edges of the first barrier layer 23 and the second barrier layer 26.

In this embodiment, the horizontal cross-sectional area (e.g., the area of the x-y plane, for example, the directions perpendicular to the thickness direction of the flexible rechargeable battery) of the first electrode current collector layer 111a, the first electrode coating layer 111b, and the second resin layer 24 is smaller than the horizontal cross-sectional area of the first barrier layer 23.

Also, the horizontal cross-sectional area (e.g., the area of the x-y plane, for example, the directions perpendicular to the thickness direction of the flexible rechargeable battery) of the second electrode current collector layer 112a, the second electrode coating layer 112b, and the fourth resin layer 27 is smaller than the horizontal cross-sectional area of the second barrier layer 26.

The encapsulation region 30a is present on the edges of surfaces of the first barrier layer 23 and the second barrier layer 26 that face each other, and the sealing part 30 is formed thereon (e.g., is formed at the encapsulation region 30a), thereby encapsulating the first conductive substrate 111 and the second conductive substrate 112.

According to other embodiments of the present disclosure, the sealing part 30 may be positioned on the edges of the first resin layer 22 of the first conductive substrate 111 and the second electrode current collector layer 112a of the second conductive substrate 112, the fourth resin layer 27, the second barrier layer 26, and/or the third resin layer 25. For example, the sealing part 30 may be formed on the edges of the first resin layer 22 and the second electrode current collector layer 112a, may be formed on the edges of the first resin layer 22 and the fourth resin layer 27, may be formed on the edges of the first resin layer 22 and the second barrier layer 26, or may be formed on the edges of the first resin layer 22 and the third resin layer 25, but the present disclosure is not limited thereto.

Figure 7:
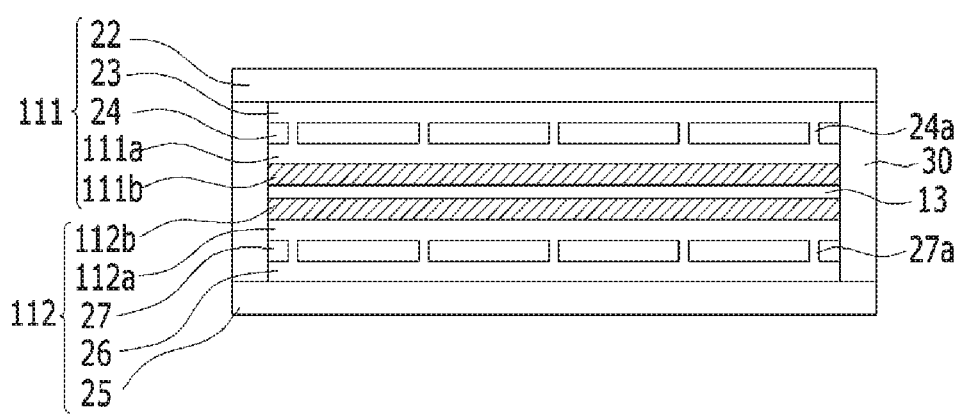

FIG. 7 shows one or more embodiments of the present disclosure in which the sealing part 30 is positioned on the edges of the first resin layer 22 and the third resin layer 25.

In this embodiment, the horizontal cross-sectional area (e.g., the area of the x-y plane, for example, the directions perpendicular to the thickness direction of the flexible rechargeable battery) of the first electrode current collector layer 111a, the first electrode coating layer 111b, the second resin layer 24, and the first barrier layer 23 is smaller than the horizontal cross-sectional area of the first resin layer 22.

Also, the horizontal cross-sectional area (e.g., the area of the x-y plane, for example, the directions perpendicular to the thickness direction of the flexible rechargeable battery) of the second electrode current collector layer 112a, the second electrode coating layer 112b, the fourth resin layer 27, and the second barrier layer 26 is smaller than the horizontal cross-sectional area of the third resin layer 25.

The encapsulation region 30a is present on the edges of surfaces of the first resin layer 22 and the third resin layer 25 that face each other, and the sealing part 30 is formed thereon (e.g., is formed at the encapsulation region 30a), thereby encapsulating the first conductive substrate 111 and the second conductive substrate 112.

According to embodiments of the present disclosure, the sealing part 30 may be formed by a method of coating and hardening an adhesive resin composition, by adhering an adhesive tape, or by a method of positioning an adhesive sheet, such as a hot-melt sheet, on the encapsulation region of the layers and then sealing the layers by heat fusion.

When forming the sealing part 30 by using the resin, the sealing part 30 may include (or may be made of) a material having the same or substantially the same thermal expansion rate as the first resin layer 22, the second resin layer 24, the third resin layer 25, and/or the fourth resin layer 27. For example, when the sealing part 30 is formed between one of the resin layers 22 and 24 of the first conductive substrate 111 and one of the resin layers 25 and 27 of the second conductive substrate 112 and when the sealing part 30, the one of the resin layers 22 and 24, and the one of the resin layers 25 and 27 are made of the same material, the shape stability of the flexible rechargeable battery 100 during the sealing process of applying the heat may be improved because the sealed components are each made of resins having the same or substantially the same thermal expansion rate.

Figure 8:
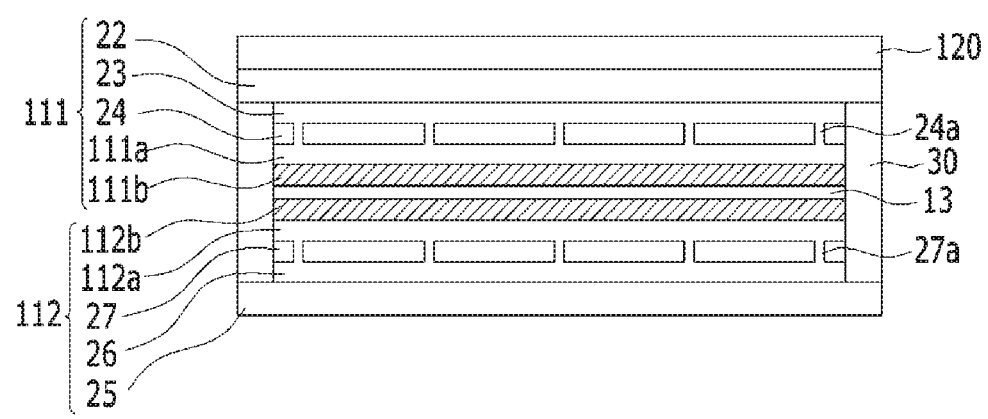

FIG. 8 is a cross-sectional view of a flexible rechargeable battery 100 according to another exemplary embodiment.

Referring to FIG. 8, the flexible rechargeable battery 100 according to one or more embodiments of the present disclosure may further include a circuit film layer 120 deposited on the outer surface of the first conductive substrate 111 and/or the second conductive substrate 112. The components indicated by the same numerals as in the previously-described embodiments are the same or are substantially the same or have the same or substantially the same configuration as the components described above, and a repeated description thereof may be omitted.

The circuit film layer 120 may include a circuit pattern and/or an antenna pattern to realize various performances (or to provide various functionality) for devices applied with (or powered by) the flexible rechargeable battery 100 according to embodiments of the present disclosure. Because a separate space is not needed to configure (or accommodate) the above-described circuit pattern and/or antenna pattern in the devices applied with (or powered by) the flexible rechargeable battery 100, the available space occupied by the flexible rechargeable battery 100 may be increased. Accordingly, the size of the flexible rechargeable battery 100 applied to a device may be greater than a conventional rechargeable battery such that a larger capacity battery is provided.

As described above, because embodiments of the present disclosure include the first conductive substrate 111 and the second conductive substrate 112 having a multi-layer structure acting as both the packing material and as the positive electrode and/or the negative electrode, the flexible rechargeable battery 100 may not be damaged due to repeated bending or folding thereof, and because separate packaging materials are not needed, the flexible rechargeable battery 100 may be relatively thin while having the same area and the same capacity compared with conventional rechargeable batteries.

Further, embodiments of the present disclosure may provide a battery pack including the above-described flexible rechargeable battery as a unit battery.

Embodiments of the present disclosure may also provide a device including the battery pack as a power source. The device may be an electronic device that is well-known in the art, for example, a mobile phone, a portable computer, a smartphone, a tablet PC, a smart pad, a smart book, an electric vehicle, a hybrid electric vehicle, a plug-in hybrid electric vehicle, and/or a power storage device, but the present invention is not limited thereto.

While this disclosure has been described in connection with what is presently considered to be practical exemplary embodiments, it is to be understood that the present disclosure is not limited to the disclosed embodiments. The present disclosure is intended to cover various modifications and equivalent arrangements included within the spirit and scope of the appended claims and their equivalents.

DESCRIPTION OF SOME OF THE REFERENCE SYMBOLS

100: flexible rechargeable battery
11: first inner electrode
11a: first inner electrode current collector layer
11b: first inner electrode coating layer
12: second inner electrode
12a: second inner electrode current collector layer
12b: second inner electrode coating layer
13: separator
111: first conductive substrate
111a: first electrode current collector layer
111b: first electrode coating layer
22: first resin layer
23: first barrier layer
24: second resin layer
24a: first conductive part
112: second conductive substrate
112a: second electrode current collector layer
112b: second electrode coating layer
25: third resin layer
26: second barrier layer
27: fourth resin layer
27a: second conductive part
30: sealing part
30a: encapsulation region
51: first electrode tab
52: second electrode tab
120: circuit film layer

What is claimed is:

1. A flexible rechargeable battery comprising:
a first conductive substrate configured as packaging material of the flexible rechargeable battery comprising a first resin layer, a first barrier layer, a second resin layer, a first electrode current collector layer, and a first electrode coating layer that are sequentially stacked inward from a first side of the flexible rechargeable battery;
a second conductive substrate configured as packaging material of the flexible rechargeable battery facing the first conductive substrate, the second conductive substrate comprising a third resin layer, a second barrier layer, a fourth resin layer, a second electrode current collector layer, and a second electrode coating layer that are sequentially stacked inward from a second side of the flexible rechargeable battery; and
a sealant at edges of the first conductive substrate and the second conductive substrate,
wherein the second resin layer includes a plurality of openings forming first conducting parts configured for allowing electrical conduction between the first barrier layer comprising a conductive metal and the first electrode current collector layer, and/or
wherein the fourth resin layer includes a plurality of openings forming second conducting parts configured for allowing electrical conduction between the second barrier layer comprising a conductive metal and the second electrode current collector layer.

2. The flexible rechargeable battery of claim 1, further comprising an electrode assembly between the first conductive substrate and the second conductive substrate, the electrode assembly comprising a first inner electrode, a second inner electrode, and a separator between the first inner electrode and the second inner electrode.

3. The flexible rechargeable battery of claim 1, wherein the sealant is at edges of the first electrode current collector layer and at edges of at least one of the second electrode current collector layer, the fourth resin layer, the second barrier layer, and the third resin layer.

4. The flexible rechargeable battery of claim 1, wherein the sealant is at edges of the second resin layer and at edges of at least one of the second electrode current collector layer, the fourth resin layer, the second barrier layer, and the third resin layer.

5. The flexible rechargeable battery of claim 1, wherein the sealant is at edges of the first barrier layer and at edges of at least one of the second electrode current collector layer, the fourth resin layer, the second barrier layer, and the third resin layer.

6. The flexible rechargeable battery of claim 1, wherein the sealant is at edges of the first resin layer and at edges of at least one of the second electrode current collector layer, the fourth resin layer, the second barrier layer, and the third resin layer.

7. The flexible rechargeable battery of claim 1, wherein at least one of the first resin layer, the second resin layer, the third resin layer, and the fourth resin layer comprises polyimide (PI), polyether ether ketone (PEEK), polyethersulfone (PES), polyetherimide (PEI), polycarbonate (PC), and/or polyethylene terephthalate (PET).

8. The flexible rechargeable battery of claim 7, wherein the first resin layer and the second resin layer comprise the same material.

9. The flexible rechargeable battery of claim 7, wherein the third resin layer and the fourth resin layer comprise the same material.

10. The flexible rechargeable battery of claim 1, wherein the sealant comprises a material having the same thermal expansion rate as that of at least one of the first resin layer, the second resin layer, the third resin layer, and the fourth resin layer.

11. The flexible rechargeable battery of claim 1, further comprising a circuit film on an outer surface of at least one of the first conductive substrate and the second conductive substrate.

12. A battery pack comprising the flexible rechargeable battery of claim 1 as a unit battery.

13. A device comprising the battery pack of claim 12 as a power source.

14. The flexible rechargeable battery of claim 1, further comprising an electrode tab connected to the first barrier layer.

15. The flexible rechargeable battery of claim 1, wherein the first and second electrode current collector layers have a mesh structure.

* * * * *